Oct. 20, 1925.

J. SAWYERS

FISHHOOK

Filed May 16, 1925

1,558,295

Inventor
J. Sawyers
By
Attorney

Patented Oct. 20, 1925.

1,558,295

UNITED STATES PATENT OFFICE.

JIM SAWYERS, OF CADDO, TEXAS.

FISHHOOK.

Application filed May 16, 1925. Serial No. 30,745.

*To all whom it may concern:*

Be it known that JIM SAWYERS, a citizen of the United States of America, residing at Caddo, in the county of Stephens and State of Texas, has invented new and useful Improvements in Fishhooks, of which the following is a specification.

The present invention has for its purpose to provide, in a fish hook, an improved swivel, whereby the hook proper carrying bait may twirl rapidly in the water due to the varying currents, so that when a fish takes the bait it cannot twist off by reason of the fact that the fish will twirl with the hook.

It is to be understood that the particulars herein given are in no way limitative and that, while still keeping within the scope of the invention, any desired modifications of detail and desired proportions may be made in the device according to the circumstances.

The invention comprises further features and combinations of parts to be hereinafter set forth, shown in the drawings and claimed.

Figure 1:
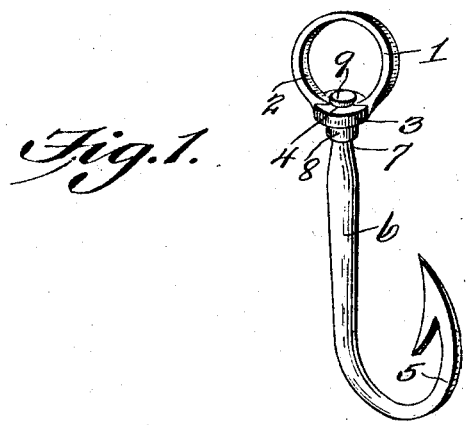
Figure 1 is a view of a fish hook showing the head of the hook and the hook proper united by a swivel joint.
Figure 2:
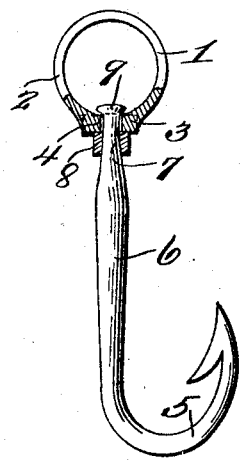
Figure 2 is a side elevational view partly broken away to show the joint in section.

Referring to the drawings, it will be noted that there is disclosed what is known as an eye hook and which may be used as a set hook. The fish hook comprises the eye head 1 which is in the form of a ring 2 having a circular base 3 provided with a central opening 4. The hook proper comprises the hook portion 5 and its shank 6, the end portion of which, where it unites with the eye head, is tapered, as shown at 7, there being a collar 8 fitted over the tapered part and secured in place by friction.

In order to swivelly connect the tapered end of the shank, that is, beyond the collar, the tapered extremity is inserted through the central opening of the base of the eye head and is swaged or peened over, as at 9. The swaging or peening over of the extremity of the tapered portion of the shank prevents disconnection of the shank in one direction while the collar prevents movement of the shank in the other direction through the base. By tapering the terminal portion of the shank and placing a collar thereon to prevent movement of the shank through the base of the eye head in one direction enables the fish hook to be manufactured more reasonably rather than turning down a collar on the shank of the hook, as it would be difficult to place the shank in a suitable holder on a machine for turning down such collar. It has been found much easier, less expensive and more practical to apply the collar to the tapered portion of the shank rather than turning it down.

The swaging or peening over of the tapered extremity of the shank can be accomplished in various ways. For instance, a tool or suitable support may be inserted through the eye head so that the extremity of the tapered end of the shank will bear against said support and then by forcing the shank toward the support, the extremity will swage over. This is especially true provided the material from which the hook is made be of relatively soft metal. It is possible to place the shank of the hook proper in a vise and then by bending the eye head laterally of its base, the extremity of the tapered end of the shank may be peened over by means of several hammer blows on the extremity.

The invention having been set forth, what is claimed is:

A fish hook comprising an eye head of substantial diameter provided with a circular base, a fish hook shank with a tapered extremity passing through the center of the base of the eye head, a detachable collar on the tapered portion of the shank below the base, the extremity of the tapered portion being swaged or peened over which, together with the collar, prevents movement of the hook shank in either direction, allowing the fish hook to twirl as well as the fish that may be suspended thereby.

In testimony whereof he affixes his signature.

JIM SAWYERS.